United States Patent Office 3,458,392
Patented July 29, 1969

3,458,392
TEAR SEAL BONDED POLYSTYRENE-SARAN LAMINATE
Charles J. Kremer, Brookhaven, Walter E. F. Lewis, Media, and Aaron Robert Gilden, Philadelphia, Pa., assignors to The Atlantic Refining Company, Philadelphia, Pa., a corporation of Pennsylvania
No Drawing. Filed Mar. 18, 1965, Ser. No. 440,943
Int. Cl. B32b 27/30, 27/08
U.S. Cl. 161—245                      4 Claims

ABSTRACT OF THE DISCLOSURE

Tear seal bonded laminates comprising (a) a polystyrene sheet having deposited on at least one side thereof an adhesive coating consisting essentially of from about 25 to about 50 weight percent wood rosin and from about 75 to about 50 weight percent of a liquid polystyrene having a molecular weight ranging from about 300 to about 1500, and (b) a polyvinylidene chloride sheet in contact with said adhesive coating. These laminates have utility in the packaging field especially for food packaging.

---

This invention relates to an adhesive for bonding polyvinylidene chloride and polystyrene. More particularly, this invention relates to a low molecular weight polystyrene-wood rosin composition which provides a tear seal bond between polyvinylidene chloride and polystyrene sheets.

Polystyrene has a high degree of water vapor transmission. Therefore, in applications such as food packaging, requiring low water vapor transmission, it must be backed with a vapor impervious film or sheet. The term "sheet" as used in this specification includes thin sheets commonly referred to as films. Sheets made from polyvinylidene chloride, generically known as saran, have low moisture vapor transmission and may be used as protective barriers for polystyrene sheets. However, it has been difficult to obtain a strong, permanent bond between the saran and polystyrene sheets. Epoxidized polymers have been utilized as the adhesive but their high cost prohibits their use in many applications. Furthermore, these adhesive coatings are opaque, thus destroying the gloss characteristics imparted by the saran.

It has been found that a composition containing low molecular weight polystyrene and wood rosin is an excellent economical adhesive for bonding saran and polystyrene sheets.

Therefore, it is an object of this invention to provide an economical adhesive for bonding saran with polystyrene.

It is a further object of this invention to provide polystyrene-saran laminates which have tear seal bonds.

The low molecular polystyrene resins which are utilized in the practice of this invention are viscous liquids at ambient temperatures and have molecular weights ranging from about 300 to about 1500. A polystyrene resin having a molecular weight ranging from about 800 to about 1500 is preferred. These styrene resins are commercially available under the trademark Piccolastic. (Pennsylvania Industrial Chemical Co.). Polymers made from substituted homologs of styrene such as alpha methyl styrene or ring alkylated styrenes may also be utilized because the presence of the additional hydrocarbon groups does not affect the adhesive behavior of the basic polystyrene molecule.

The saran polymers which may be utilized in the practice of this invention include homopolymers of vinylidene chloride and copolymers of vinylidene chloride having a minor amount of a comonomer such as vinyl acetate, vinyl chloride, acrylonitrile, etc.

If heat is to be applied during lamination, it is desirable to utilize a saran sheet which has had prior heat treatment to prevent excessive shrinkage. Such a sheet is commercially known as "pre-shrunk" saran.

The adhesive is prepared by combining from about 25 to about 50 weight percent wood rosin with from about 75 to about 50 weight percent of the low molecular weight polystyrene. A particularly preferred composition contains from about 30 to about 35 weight percent wood rosin and from about 70 to about 65 weight percent of the low molecular weight polystyrene. When combining the wood rosin and polystyrene, it is desirable to apply heat to the mixture to promote dissolution. Mix temperatures in the range of 140°–160° F. will suffice.

It is usually desirable to lower the viscosity of the adhesive composition in order to obtain a uniform coating on the polystyrene sheet. This may be accomplished by heating the composition or by adding a solvent such as a light petroleum solvent until the desired viscosity is obtained.

EXAMPLE I

An adhesive composition was prepared by dissolving 32 grams of wood rosin in 68 grams of a 150° F. polystyrene having a molecular weight of approximately 1000. This adhesive composition was then deposited as an 0.1 mil coating on a polystyrene sheet immediately after the sheet emerged from the extruder die. The sheet temperature was approximately 300° F. A 10 mil pre-shrunk saran film was contacted with the adhesive coating and the resulting laminate cooled to room temperature. The laminate bond had a tear seal value of 400 grams per inch. The adhesive composition also prevented blistering and shrinking of the saran film and did not impair the gloss characteristics imparted by the saran.

The term "wood rosin" as used throughout this specification includes the modified and unmodified forms of wood rosin well-known to those skilled in the art. Common examples of the modified forms include hydrogenated, disproportionated and polymerized wood rosins.

The laminates of this invention are particularly suited for food packaging applications. For example, containers made from heavier gauge laminates are outstanding for food storage, and thin film laminates provide a clear, glossy, waterproof food wrap.

We claim:
1. A tear seal bonded laminate comprising
   (a) a polystyrene sheet having deposited on at least one side thereof an adhesive coating consisting essentially of from about 25 to about 50 weight percent wood rosin and from about 75 to about 50 weight percent of a liquid polystyrene having a molecular weight ranging from about 300 to about 1500, and
   (b) a polyvinylidene chloride sheet in contact with said adhesive coating.

2. A tear seal bonded laminate according to claim 1 wherein the liquid polystyrene in the adhesive composition has a molecular weight ranging from about 800 to about 1500.

3. A tear seal bonded laminate according to claim 1 wherein the adhesive composition consists essentially of from about 30 to about 35 weight percent wood rosin, and from about 70 to about 65 percent liquid polystyrene.

4. A tear seal bonded laminate according to claim 3 wherein the liquid polystyrene has a molecular weight ranging from about 800 to about 1500.

References Cited

UNITED STATES PATENTS 2,271,093  1/1942  Pier et al.

FOREIGN PATENTS 375,320  6/1932  Great Britain.

OTHER REFERENCES

Piccolastic Resins Catalog (page 13), published by Pennsylvania Industrial Chemical Corp., February, 1962.

ROBERT F. BURNETT, Primary Examiner

LINDA M. CARLIN, Assistant Examiner

U.S. Cl. X.R.

99—171; 106—239; 156—334; 161—254; 260—27, 669